Patented Apr. 23, 1946

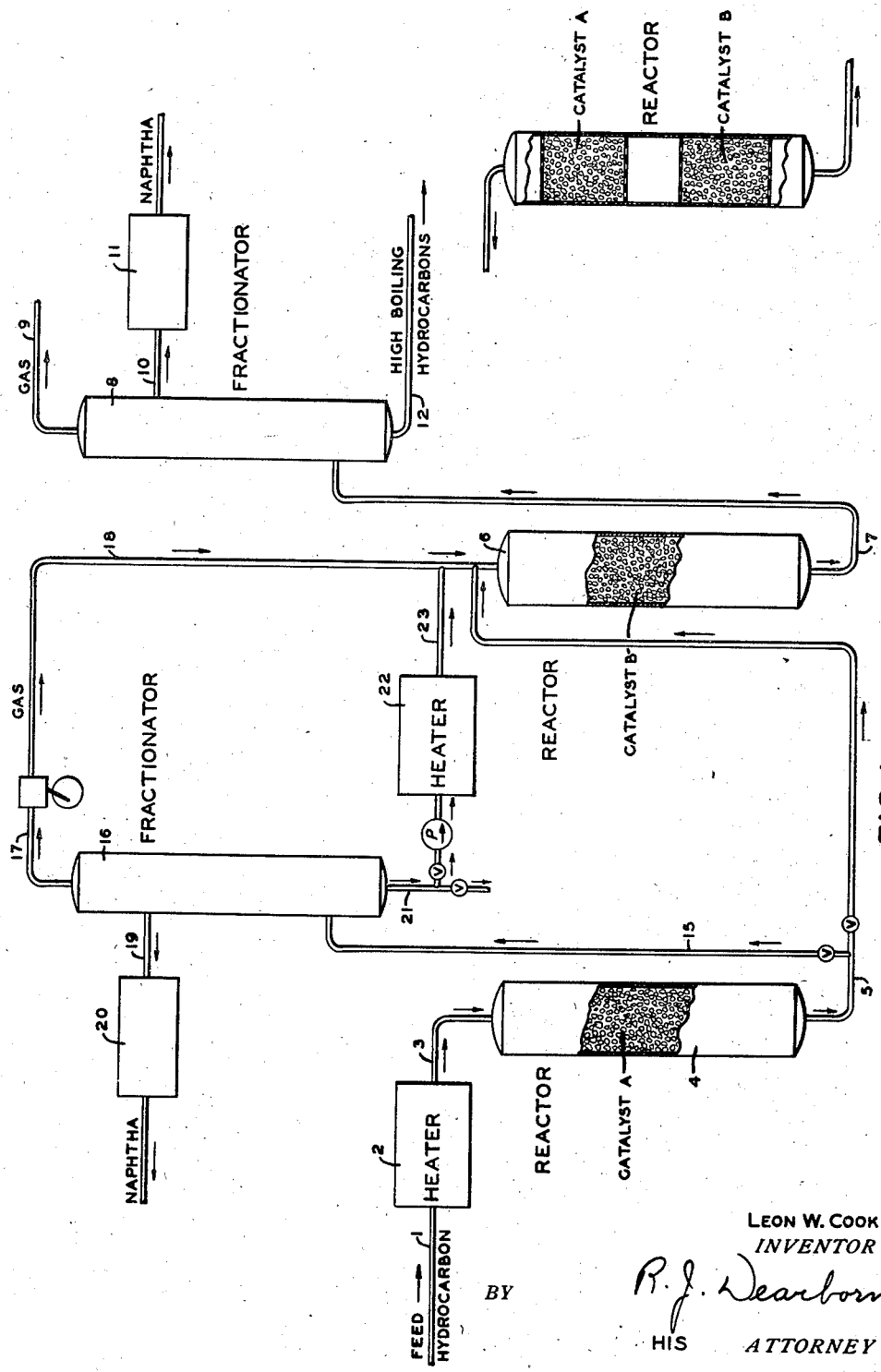

2,398,819

UNITED STATES PATENT OFFICE 2,398,819

CONVERSION OF HYDROCARBONS

Leon W. Cook, Beacon, N. Y., assignor to The Texas Company, New York, N. Y., a corporation of Delaware Application March 20, 1942, Serial No. 435,493

8 Claims. (Cl. 196—52)

This invention relates to the catalytic conversion of hydrocarbons and more particularly to the conversion of higher boiling hydrocarbons into lower boiling hydrocarbons for the production of motor fuel.

The invention contemplates a process for converting higher boiling hydrocarbons into lower boiling hydrocarbons which comprises subjecting a mixture of hydrocarbons including paraffins and naphthenes to the action of a catalyst highly effective for cracking naphthene hydrocarbons and another catalyst highly effective for cracking paraffin hydrocarbons whereby improved results are obtained from the standpoint of yield of gasoline having superior characteristics.

I have found that certain conversion catalysts are capable of converting a given class of gas oil hydrocarbons into relatively high yields of lower boiling hydrocarbons but are apparently substantially less effective in converting a different class of hydrocarbons. For example, an aluminum fluoride type of catalyst containing hydrated aluminum fluoride is capable of converting naphthene hydrocarbons such as decahydronaphthalene to 50 mol per cent or more of gas, gasoline and carbon under certain conditions of temperature and space velocity but under the same conditions of operation converts paraffinic hydrocarbons such as hexadecane to only about 25% or less than about 30% of gas, gasoline and carbon.

A different type of catalyst, such as alumina associated with or impregnated with boron oxide, will exhibit substantially the reverse characteristics being highly effective in converting paraffin hydrocarbons and less effective in converting naphthene hydrocarbons. For example, such a catalyst under the same conditions may effect conversion of the paraffin hydrocarbon into 50% or more of gas, gasoline and carbon, while effecting conversion of naphthene hydrocarbons into about 30% or 35% of gas, gasoline and carbon.

In accordance with the invention the hydrocarbon mixture undergoing conversion may be subjected to the action of the individual catalysts substantially simultaneously as when maintaining a physical mixture of the catalysts within the reaction zone or zones. It is also contemplated that the individual catalysts may be maintained in separate zones or in separate portions of the reaction zone. For example, when employing a single reactor comprising a tower packed with the catalyst in solid fragmentary form a plurality of separate catalyst beds may be used in the reactor, each bed comprising an individual catalyst. Where separate reactors are employed each reactor may be packed with a different catalyst.

An advantage in the case of employing separate reactors is that provision may be made for separating lighter products of conversion including gasoline and gases rich in hydrogen from the hydrocarbon stream flowing from one stage to the next. In this way the higher boiling material continues to flow throughout the successive stages in series. Advantageously either hydrogen, hydrogen-rich gas, or both, separated from the gasoline removed between stages may be returned to the system so that the further conversion of the hydrocarbon material may be effected in the presence of such gases. Hydrogen-rich gas may include hydrocarbons such as methane, ethane, ethylene, propane and propylene etc.

Reference will now be made to the accompanying drawing to assist in the further description of the invention.

Referring to Fig. 1 a feed hydrocarbon stream containing naphthene and paraffin hydrocarbons boiling in the gas oil range and such as derived from a mixed base crude or any other crude source containing both naphthenes and paraffins is conducted from a source not shown through a pipe 1 to a heater 2. In the heater the hydrocarbons are vaporized and heated to an elevated temperature in the range 900 to about 1050° F. The so heated hydrocarbon vapor is conducted through a pipe 3 leading to a reactor 4. The reactor 4 may comprise a tower or vessel packed with solid catalyst in fragmentary form, i. e., lumps, pellets, particles, etc. The catalyst in this reactor advantageously comprises hydrated aluminum fluoride mixed with or associated with a solid catalytically active adsorbent material of either silicious or non-silicious nature.

The hydrocarbons are caused to flow through the catalyst mass which may be in the form of a plurality of separate beds maintained under conditions such that substantial conversion into gasoline hydrocarbons occurs.

The hydrocarbons containing products of conversion are continuously withdrawn from the reactor through a pipe 5 and may be conducted directly to a reactor 6 substantially similar to the reactor 4 but packed with a different catalyst such as aluminum silicate or alumina mixed with boron oxide.

Conditions are maintained in the reactor 6 so as to effect further conversion of the hydrocarbons. The products of conversion from the reactor 6 are withdrawn through a pipe 7 leading to a fractionator system 8 which may comprise one or more individual towers operating in conjunction with each other.

The fractionator system 8 may be operated so as to effect removal of normally gaseous constituents, which may be discharged through a pipe 9. A separate stream comprising naphtha or gasoline hydrocarbons may be removed through a pipe 10 and cooler 11 while higher boiling material is withdrawn through a pipe 12.

The hydrocarbon mixture drawn off from the reactor 4 may be diverted through a branch pipe 15 leading to a fractionator 16. The fractionator 16 can be operated so as to remove lighter products of conversion including hydrogen, gas and gasoline hydrocarbons. The hydrogen and hydrogen-rich gas is drawn off through a pipe 17 and forced through a pipe 18 to the inlet of the reactor 6.

The gasoline hydrocarbons can be removed as a side stream from the fractionator 6 through a pipe 19 and a cooler 20. While the higher boiling material including converted and unconverted hydrocarbons are drawn off from the bottom of the fractionator 16 through a pipe 21 and are conducted through a heater 22 wherein they are reheated to the desired conversion temperature, the reheated hydrocarbons are conducted from the heater 22 through a pipe 23 communicating with the inlet to the reactor 6 through which they pass together with gas from the pipe 18.

As already mentioned the catalyst employed in the reactor 4 is of the aluminum fluoride type and preferably hydrated aluminum fluoride, which is highly effective in cracking naphthene hydrocarbons. The cracking of naphthene hydrocarbons involves conversion into aromatic hydrocarbons and free hydrogen. Consequently, the gasoline hydrocarbons removed in the fractionator 16 and discharged through the cooler 20 will be of relatively high aromatic character.

The catalyst employed in the reactor 6 is highly effective in cracking paraffin constituents of the feed. Under ordinary conditions cracking of paraffins involves conversion to olefins. The present invention, however, involves effecting this conversion in the reactor 6 in the presence of hydrogen and hydrogen-rich gases formed in the reactor 4 so as to increase the production of saturated gasoline hydrocarbons formed in the reactor 6. Therefore, the gasoline hydrocarbons separated in the fractionator 8 and discharged through the cooler 11 will be rich in saturated hydrocarbons.

Reduction in the olefinic content of cracked gasoline is desirable from the standpoint of increasing its lead susceptibility and thereby rendering it superior as aviation motor fuel.

The gasoline products separately discharged from the coolers 11 and 20, respectively, can be blended in any desired proportion or may be disposed of separately.

By employing separate reactors 4 and 6 as above described, it is thus possible to remove the gasoline hydrocarbons substantially as rapidly as formed. This is advantageous where it is desired to maintain the succeeding reactor under more drastic cracking conditions.

However, where it is not desired to segregate the gasoline between stages or prior to treatment with the succeeding catalyst of different characteristics a single reactor may be employed as illustrated in Fig. 2. As indicated in the figure the reactor is packed with two separate catalyst beds, the upper bed comprises the catalyst specific for the conversion of naphthene hydrocarbons, while the lower bed comprises the catalyst specific for the conversion of paraffin hydrocarbons.

From the standpoint of favoring the hydrogen transfer reaction it may be desirable to subject the hydrocarbon mixture to substantially simultaneous action of the two catalysts and this may be effected as intimated at the outset by employing the two separate catalysts in a physical mixture. Thus, the reactor or reactors may be packed with mixtures of the two separate catalysts mixed together in substantially equal proportions or in any proportion desired. For example, the proportions may be adjusted depending upon the ratio of naphthenes to paraffins contained in the initial feed mixture. Here again the reactor may be packed with the mixed catalyst arranged in a plurality of beds through which the hydrocarbons undergoing treatment flow in succession.

Hydrated aluminum fluoride type catalysts containing a small amount of alumina, i. e., about 1 to 10% by weight, and which are stable at temperatures below about 1200 to 1300° F. have been found particularly effective in promoting the conversion of naphthene hydrocarbons. Examples of such catalysts are:

(1) Magnesium fluoride-silica-aluminum fluoride catalyst in which the magnesium fluoride amounts to about 2% and the aluminum fluoride in the form of the hemihydrate amounts to about 6% by weight, prepared by precipitating the magnesium fluoride in the presence of silica gel, finely divided aluminum fluoride hydrate being added to the mixture prior to precipitation of the magnesium fluoride;

(2) Aluminum fluoride-magnesia catalyst containing about 20% $AlF_3$ hemihydrate, prepared by forming a slurry of commercial magnesia and treating the slurry with solutions of aluminum chloride and ammonium fluoride;

(3) Super-Filtrol-aluminum fluoride hemihydrate, comprising a physical mixture containing about 10% by weight of the fluoride ground to about 40 to 50 mesh;

(4) Aluminum phosphate in admixture with hydrated aluminum fluoride, i. e., the mixture containing about 1 to 20% by weight of the hydrated fluoride.

By way of example, a catalyst comprising about 80% $SiO_2$, 15% $MgF_2$ and 5% $AlF_3.1/2H_2O$ may be prepared in this way. A quantity of sodium-free hydrated silica is obtained by neutralizing a dilute solution of sodium silicate with dilute hydrochloric acid, filtering and washing free of sodium in the wet state. 4830 grams of this silica gel containing approximately 400 grams of $SiO_2$ are then slurried with 10 liters of water until a uniform dispersion results. To this slurry is added a finely ground mixture containing 90 grams of ammonium fluoride and 30 grams of $AlF_3.1/2H_2O$. The mixture is stirred during the addition and the stirring continued for about 20 minutes. After this the slurry is treated with about 2 liters of an aqueous solution of magnesium chloride containing about 7% by weight of $MgCl_2$, stirring being continued for about 1 hour.

The pH value is thereafter adjusted to about 7 with dilute hydrochloric acid and ammonium hydroxide solutions. The resulting precipitate is removed by filtration and washed once by slurrying with water and filtering. The washed precipitate is dried to about 20% water content at 250° F. and pelleted, following which the resulting pellets are calcined at 1000° F. for 6 hours.

A solid catalyst comprising a major proportion of aluminum phosphate and a minor proportion of a solid hydrated metallic fluoride can be prepared in the following manner: 987 grams of aluminum chloride-hexahydrate are dissolved in 2.5 liters of distilled water, and 471 grams of 85% phosphoric acid are dissolved in a separate portion of water sufficient to form a total volume of 2.5 liters of dilute acid. The two solutions are mixed with thorough agitation and the mixture treated with ammonium hydroxide solution (consisting of equal parts by weight of distilled water and concentrated ammonium hydroxide of 0.88 specific gravity) to form a precipitate. Sufficient hydroxide solution is added to render the mixture just acid to litmus. The resulting precipitate is removed by filtering and washing with distilled water.

Hydrated aluminum fluoride is prepared by treating an aqueous solution of aluminum chloride with an aqueous solution of ammonium fluoride in stoichiometric proportions to form aluminum fluoride hydrate. After washing and drying the precipitated hydrate is decomposed by heating several hours at 1000° F. to form hemihydrate ($AlF_3.1/2H_2O$). This hemihydrate ground to 200 mesh is then mixed with a slurry of the above-mentioned aluminum phosphate in water. The fluoride is added in a proportion sufficient to give a composite containing 20% $AlF_3.1/2H_2O$ by weight. This composite is filtered and dried at 250° F. following which it is ground to 40 mesh, pelleted and calcined by heating at 1000° F. for 8 hours. The resulting catalyst consists of about 20% by weight of aluminum fluoride hemihydrate and 80% aluminum phosphate, the phosphate containing a small amount of alumina, i. e., 1 to 10% by weight.

As mentioned previously boron oxide mixed with alumina, Porocel and the like provides an effective catalyst for promoting the conversion of paraffin hydrocarbons. Additional examples of catalysts effective for this purpose comprise: synthetic aluminum silicate comprising a calcined mixture of separately precipitated alumina hydrogel and silica hydrogel prepared as disclosed in U. S. Patent No. 2,229,353; synthetic alumina silicate containing zirconia, such as described in U. S. Patent No. 2,249,583, etc.

In applying the invention to the cracking of gas oils containing both naphthene and paraffin hydrocarbons, it is advantageous to effect treatment with the feed oil in the vapor phase at temperatures which may range from about 800 to 1050° F. and under pressures about atmospheric and somewhat above. Where a plurality of reaction zones are employed different temperature conditions may be maintained in each zone.

The time of contact between hydrocarbons and catalyst may be substantially the same in each reaction zone although it is also contemplated that different times of contact may prevail in each reactor.

While a stationary catalyst bed has been referred to, nevertheless it is contemplated that so-called "fluidized" catalyst beds, wherein the individual catalyst particles are subjected to a small amount of motion, may be used as well as reactors in which the catalyst in finely powdered form is suspended in a mass of hydrocarbon vapors undergoing conversion.

It will, of course, be understood that the catalyst will require regeneration which may be accomplished in the conventional manner. For example, when operating with a stationary catalyst bed sufficient reactors are used so that when one reactor is offstream undergoing regeneration, another reactor may be maintained onstream with activated catalyst.

The cracking reaction may also be effected in the presence of extraneous agents, gaseous or otherwise, for example, phosphoryl fluoride may be added to the stream of feed hydrocarbon passing through the cracking reaction zone for the purpose of oxidizing carbon formed during the conversion and thereby prolong the active life of the catalyst. In such case provision may be made for recycling the effluent gases containing phosphoryl fluoride.

While mention has been made of cracking a gas oil feed containing naphthene and paraffin hydrocarbons, it is contemplated that the feed oil may contain other hydrocarbons such as aromatics in addition to the naphthenes and paraffins.

Obviously many modifications and variations of the invention, as hereinbefore set forth, may be made without departing from the spirit and scope thereof, and therefore only such limitations should be imposed as are indicated in the appended claims.

I claim:

1. A cracking process for the production of gasoline hydrocarbons which comprises obtaining a mixture of both paraffin and naphthene hydrocarbons boiling in the gas oil range, passing said mixture in the form of hot vapors through a reaction zone containing two different catalysts, one catalyst comprising aluminum fluoride and characterized by being relatively more effective in cracking naphthene hydrocarbons than paraffin hydrocarbons and the other comprising boron oxide and characterized by being relatively more effective in cracking paraffin hydrocarbons than naphthene hydrocarbons, maintaining the reaction zone at a temperature in the range about 800 to 1050° F. such that substantial conversion of higher boiling hydrocarbons into gasoline hydrocarbons occurs and removing converted hydrocarbons from the reaction zone.

2. A cracking process for the production of gasoline hydrocarbons which comprises obtaining a mixture of both paraffin and naphthene hydrocarbons boiling in the gas oil range, passing said mixture in the form of hot vapors through a reaction zone containing two different catalysts, one catalyst consisting essentially of a compound containing about 80% $SiO_2$, 15% $MgF_2$ and 5% $AlF_3.1/2H_2O$ and the other catalyst consisting essentially of alumina impregnated with boron oxide, maintaining the reaction zone at a temperature in the range about 800 to 1050° F. such that substantial conversion of higher boiling hydrocarbons into gasoline hydrocarbons occurs and removing converted hydrocarbons from the reaction zone.

3. A cracking process for the production of gasoline hydrocarbons which comprises obtaining a mixture of both paraffin and naphthene hydrocarbons boiling in the gas oil range, passing said mixture in the form of hot vapors through a reaction zone containing two different catalysts, one catalyst consisting essentially of aluminum phosphate and aluminum fluoride and the other catalyst consisting essentially of alumina impregnated with boron oxide, maintaining the reaction zone at a temperature in the range about 800 to 1050° F. such that substantial conversion of higher boiling hydrocarbons into gasoline hydrocarbons occurs and removing converted hydrocarbons from the reaction zone.

4. A process for the catalytic conversion of hydrocarbons to form gasoline hydrocarbons which comprises obtaining a mixture of both paraffin and naphthene hydrocarbons higher boiling than gasoline, passing said mixture in the form of mixed vapors at elevated temperature through a conversion reaction zone, subjecting the vapors during passage through the reaction zone to contact with separately constituted individual cracking catalysts substantially free from dehydrogenating metal oxides and sulfides, one of said catalysts comprising aluminum fluoride and characterized in being relatively more effective in cracking naphthene hydrocarbons than paraffin hydrocarbons at said elevated temperature while the other catalyst is selected from the group consisting of composites of alumina and boron oxide and composites of alumina and silica and is characterized in being relatively more effective in cracking paraffin hydrocarbons than naphthene hydrocarbons at said elevated temperature, effecting contact between the vapors and both said catalysts at a cracking temperature such that substantial cracking occurs, and removing converted hydrocarbons including gasoline hydrocarbons from the reaction zone.

5. The process according to claim 4 in which the conversion reaction is effected at a temperature in the range 800 to 1050° F.

6. A process for the catalytic conversion of hydrocarbons to form gasoline hydrocarbons which comprises obtaining a mixture of both paraffin and naphthene higher boiling hydrocarbons, passing said mixture in the form of mixed vapors at elevated temperature through a conversion reaction zone, subjecting the vapors during passage through the reaction zone to contact with separate composite catalysts substantially free from dehydrogenating metal oxides and sulfides, one composite comprising aluminum fluoride and characterized by being relatively more effective in cracking naphthene hydrocarbons than paraffin hydrocarbons at said elevated temperature, the other composite comprising boron oxide and characterized by being relatively more effective in cracking paraffin hydrocarbons than naphthene hydrocarbons at said elevated temperature, effecting contact between the vapors and both said catalysts at a cracking temperature such that substantial cracking into low boiling hydrocarbons occurs, and removing converted hydrocarbons including gasoline hydrocarbons from the reaction zone.

7. A process for the catalytic conversion of hydrocarbons to form gasoline hydrocarbons which comprises obtaining a mixture of both paraffin and naphthene higher boiling hydrocarbons, passing said mixture in the form of mixed vapors at elevated temperature through a conversion reaction zone, subjecting the vapors during passage through the reaction zone to contact with separate composite catalysts substantially free from dehydrogenating metal oxides and sulfides, one composite consisting essentially of a compound containing about 80% $SiO_2$, 15% $MgF_2$ and 5% $AlF_3.1/2H_2O$ and characterized by being relatively more effective in cracking naphthene hydrocarbons than paraffin hydrocarbons at said elevated temperature, the other composite consisting essentially of a catalyst selected from the group consisting of composites of alumina and boron oxide and composites of alumina and silica and being characterized in being relatively more effective in cracking paraffin hydrocarbons than naphthene hydrocarbons at said elevated temperature, effecting contact between the vapors and both said catalysts at a cracking temperature such that substantial cracking into lower boiling hydrocarbons occurs, and removing converted hydrocarbons including gasoline hydrocarbons from the reaction zone.

8. In the catalytic conversion of higher boiling hydrocarbons into lower boiling hydrocarbons wherein a feed hydrocarbon comprising paraffin and naphthene hydrocarbons is passed through a reaction zone containing solid catalyst maintained under cracking conditions for the hydrocarbons, the steps comprising effecting initial cracking by the action of a catalyst consisting essentially of a compound containing about 80% $SiO_2$, 15% $MgF_2$ and 5% $AlF_3.1/2H_2O$ and stable at temperatures below about 1200° F., and thereafter subjecting the partially cracked hydrocarbons to the action of a different catalyst consisting essentially of alumina impregnated with boron oxide and being highly active in cracking paraffin hydrocarbons.

LEON W. COOK.